UNITED STATES PATENT OFFICE.

FRED. A. NICKERSON, OF SPRINGFIELD, MASSACHUSETTS, ASSIGNOR TO THE DICKINSON HARD RUBBER COMPANY, OF SAME PLACE.

METHOD OF INLAYING HORN, &c., WITH PIGMENT COLORS.

SPECIFICATION forming part of Letters Patent No. 251,924, dated January 3, 1882.

Application filed May 31, 1881. (No specimens.)

*To all whom it may concern:*

Be it known that I, FRED. A. NICKERSON, a citizen of the United States, residing at Springfield, in the county of Hampden and State of Massachusetts, have invented new and useful Improvements in Methods of Inlaying Horn, &c., with Pigment Colors, of which the following is a specification.

This invention relates to improvements in inlaying with pigment colors the surface of horn, celluloid, and other materials which are composed of gums and other ingredients, whereby plastic substances are formed which, like the before-mentioned horn and celluloid, are susceptible of being softened and molded under the influence of heat and pressure, and which become rigid and hard when cold, the object being to provide improved methods for inlaying pigment colors for ornamental purposes into the surface of said materials.

This process is applicable to a great variety of articles of manufacture, and is limited in its application only to articles of such dimensions as can be conveniently submitted to the requisite heat and pressure between plates or dies, as hereinafter described.

In carrying out my invention I take pieces of horn, celluloid, and said other plastic substances, all of which will soften under heat, and, having reduced them to the requisite form and smoothness, I first form or apply raised figures of ornamental or other designs upon the surface thereof by laying thereupon pigment colors softened slightly by the admixture therewith in small quantities of any of the well-known oils or spirits used for that purpose. Said colors, prepared as above described, are "stiff," as termed by color-mixers, or as much so as will permit of their manipulation in forming figures therefrom upon said materials or in applying them thereto. The said figures may be laid on with a common brush, or be stenciled on; or figures may be formed in shallow molds and then be applied to the surface of pieces to be ornamented; or the entire surface may be covered. Having thus applied said colors to said materials, the latter are set aside until said colors shall have become sufficiently dry and hard, when they will be found to lie up entirely above the surface upon which they are placed and to adhere thereto. Said colors so applied to said surfaces and dried as aforesaid are not susceptible of having their hardness reduced by any degree of heat which will soften the said horn, celluloid, and other materials, so that when the latter are heated and softened said colors still remain more rigid and firm than the material upon which they are applied. Having prepared said pieces and placed the colors thereon and dried them, they are next placed between heated plates or dies, and the whole is submitted to a strong pressure. The said heated plates or dies, coming in contact with said pieces, cause the latter to lose their rigidity and to soften to a certain extent, while the degree of heat which will so operate upon said materials will not act in like manner upon said dried pigment color or colors lying upon their surface, and the result is that said colors by said pressure become sunken or inlaid into the softened surface upon which they were applied and dried, as aforesaid; and when said pieces are cooled and removed from said plates or dies said colors will be found to be perfectly inlaid, and the outlines of the figures formed by them will be nearly, if not quite, the same as they were before having been heated and pressed, showing no distortion thereof such as would result if said colors yielded to the influence of the heat and became at all soft. After said ornamented and pressed pieces have been removed from said plates or dies they may be finished in any desirable way.

What I claim as my invention is—

The within-described improvement in the method of inlaying with colors the surface of horn, celluloid, and other rigid substances which are softened by heat, which consists in forming upon the surface thereof while cold and rigid ornamental figures composed of colors adhesive to said cold surface, which, when dried, retain their form under heat and pressure, and in forcibly inlaying said colors into the surface of said materials by heating and pressing them after said colors shall have become dry and hard thereupon, substantially as set forth.

FRED. A. NICKERSON.

Witnesses:
C. L. HOTCHKISS,
B. V. MORSE.